Dec. 18, 1923.
J. BATH
ADJUSTABLE GAUGE
Filed Aug. 10, 1920
1,477,531
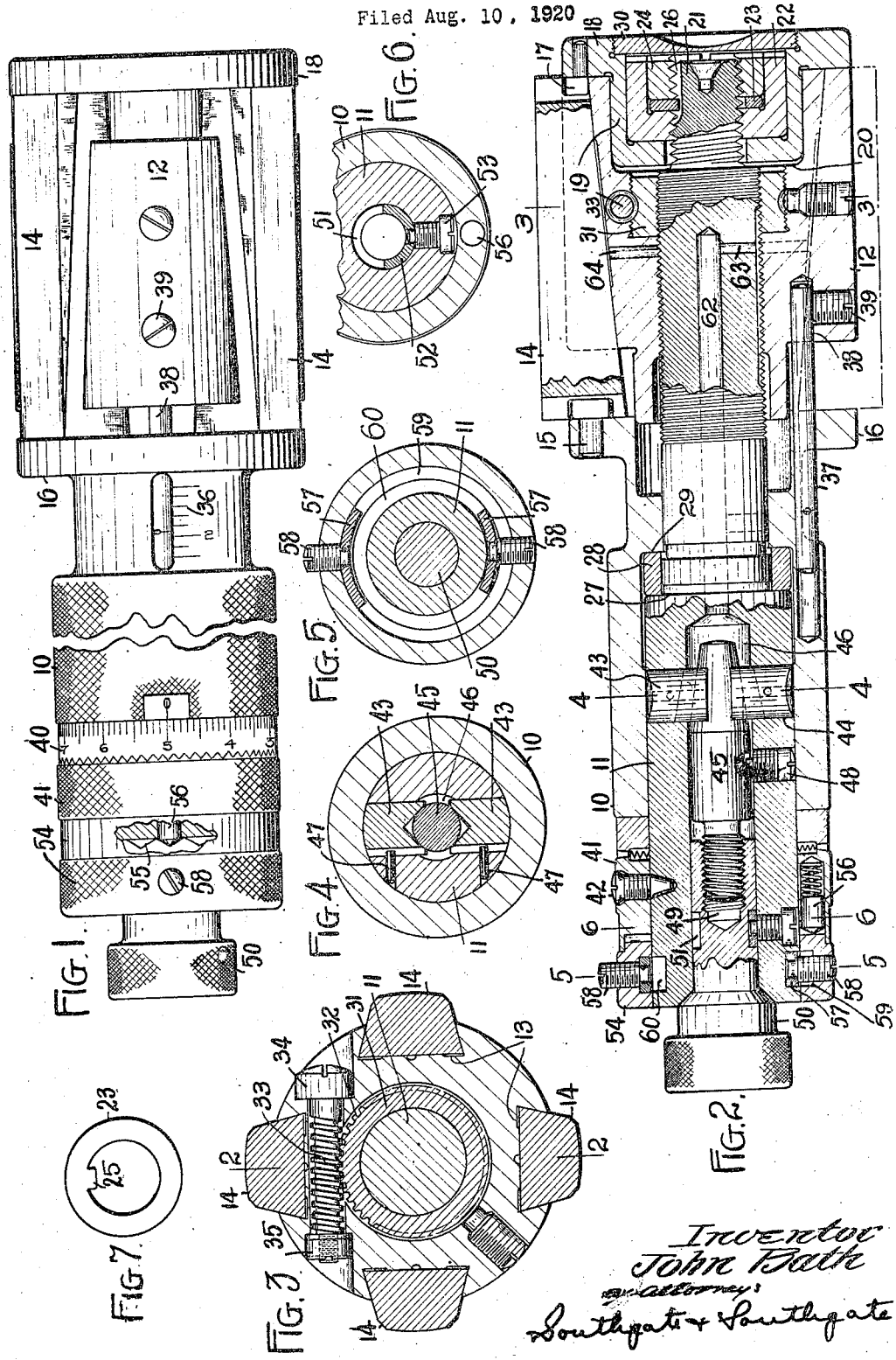
Inventor
John Bath
by attorney:
Southgate & Southgate Patented Dec. 18, 1923.

1,477,531

UNITED STATES PATENT OFFICE.

JOHN BATH, OF WORCESTER, MASSACHUSETTS, ASSIGNOR TO JOHN BATH & CO. INC., OF WORCESTER, MASSACHUSETTS, A CORPORATION OF MASSACHUSETTS.

ADJUSTABLE GAUGE.

Application filed August 10, 1920. Serial No. 402,608.

*To all whom it may concern:*

Be it known that I, JOHN BATH, a citizen of the United States, residing at Worcester, in the county of Worcester and State of Massachusetts, have invented a new and useful Adjustable Gauge, of which the following is a specification.

This invention relates to improvements in an adjustable guage of the type shown in the prior application of Bath and Gray, Serial No. 300,053, filed May 25th, 1919.

Such gauges are particularly designed for making accurate measurements of internal diameters, although they may also serve other useful purposes. It is the general object of my present invention to improve the details of construction of such adjustable gauges and to thereby render the tool better adapted for the purposes for which it is designed.

With this object in view, my invention includes the following important features, namely; an improved device for locking the gauge to preserve the gauge reading or adjustment, so designed that wear of the parts will be materially reduced; means to adjust the gauge with a uniform yielding tension; improved devices for taking up lost motion or back lash in the thread of the shaft; improvements in the devices for taking up longitudinal play of said shaft; and an improved and simplified size-indicating device, independent of the gauge bars.

My invention further relates to other arrangements and combinations of parts which will be hereinafter described and more particularly pointed out in the appended claims. A preferred form of my invention is shown in the drawings, in which Fig. 1 is a plan view of my improved gauge;

Fig. 2 is a horizontal sectional view thereof;

Figs. 3, 4 and 5 are transverse sectional views taken along the lines 3—3, 4—4 and 5—5 in Fig. 2;

Fig. 6 is a partial sectional view taken along the line 6—6 in Fig. 2; and

Fig. 7 is a detail view of a washer to be described.

Referring to the drawings, it will be seen that the gauge is of the general type disclosed in the prior application previously noted and comprises a body or casing 10, a threaded shaft 11, and a member 12 threaded on said shaft and movable longitudinally thereby relative to the body 10. The member 12 is provided with a number of inclined dove-tailed guide-ways 13, (Fig. 3), in which gauge bars 14 are slidably mounted. The bars 14 are of corresponding dove-tailed cross section and are provided with inclined inner faces, as clearly shown in Fig. 2.

One or more bars 14 is radially slotted at its ends to recive a key or pin 15 mounted in the flange 16 of the body 10, and an additional key or pin 17 mounted in a flanged collar 18. Angular displacement of the member 12 and bars 14 relative to the body 10 is thus prevented.

The collar 18 has a portion 19 extending into a recess 20 in the end of the member 12. A threaded extension 21 of the shaft 11 extends freely through the portion 19 of the collar 18 and supports a binding nut 22, a washer 23 and a lock nut 24. The nut 22 has an external bearing in a recess of the collar 18 and the nut 24 is similarly positioned in a recess of the nut 22. The washer 23 is slidable on the portion 21 of the threaded shaft, but is held from rotation by a lug 25 (Fig. 7) extending into a key-way 26 in the portion 21 of the threaded shaft.

The shaft 11 is provided with a shoulder 27 against which a hardened steel collar 28 is seated, said collar forming a thrust bearing against a shoulder 29 formed on the inside of the body 10. All end play of the threaded shaft 11 is taken up by means of the nuts 22 and 24 which draw the collar 28 firmly against the shoulder 29 on the body 10, and at the same time draw the collar 18 against the ends of the gauge bars 14, holding the latter against the flange 16 of the body 10.

When the parts are thus adjusted as desired, the opening in the end of the collar 18 may be closed by a disc 30, threaded in the end of the collar. This disc effectually protects the parts within from dirt and injury.

A nut 31 (Figs. 2 and 3) is threaded into a recess in the member 12 and is also threaded onto the shaft 11. By slightly adjusting the nut 31 angularly, all wear and lost motion between the shaft 11 and member 12 may be taken up. For the purpose of such angular adjustment, I provide worm gear teeth 32 on the outside of the nut 31, engaged by a worm 33 mounted in bearings extending transversely of the body 12. The worm is provided with a slotted head 34 by which it may be adjusted and with a slotted nut 35 at the other end for holding the adjustment. Wear of the parts may thus be taken up without disturbing the endwise adjustment of the shaft 11.

Improved devices are provided for indicating the gauge diameter. These devices include a scale 36, (Fig. 1) on the body 10, cooperating with an index or zero line on a rod 37 adjustably secured in a recess 38 (Fig. 2) in the member 12 by a set screw 39. The rod also extends into a recess in the body 10, a portion of one side of which is cut away as shown in Fig. 1 so that the zero line may be read in connection with the scale 36.

A second zero line is placed at the opposite end of the body 10 and cooperates with a graduated ring 40 mounted to rotate with the shaft 11. The ring is connected to the shaft through a serrated collar 41, fixed in position on the shaft by a taper pointed set screw 42. By loosening the set screw, the collar 41 may be slipped outward so that the ring 40 may be adjusted angularly to the extent of one or more teeth, bringing the zero line to indicate the correct scale reading when the gauge bars are set to a predetermined standard size.

A substantially similar graduated ring construction is described and claimed in my prior application Serial No. 351,686, filed January 15, 1920, but the provision of the sliding rod 37 is novel in this application and I consider the same to constitute an important improvement.

It is often desirable to lock the gauge after adjustment, and for this purpose, I provide binding plugs 43 (Fig. 2) mounted in a transversely extending or radial recess 44 in the shaft 11. At their outer ends, the plugs engage the inner surface of the body 10, and at their inner ends they are grooved for engagement by the conical point of a plunger 45, slidable in a recess 46 in the shaft 11. Pins 47 (Fig. 4) prevents displacement of the plugs 43 angularly and a stud or screw 48 (Fig. 2) similarly prevents rotation of the plunger 45.

The outer end of the plunger 45 is threaded to fit within a correspondingly threaded recess 49 in an actuating member 50, rotatably mounted in the recess 46 of the shaft 11. The member 50 is circumferentially grooved at 51 (Figs. 2 and 6) to receive a block or shoe 52 which may be fixed in position by a stud or screw 53 in the shaft 11.

The parts are assembled by placing the shoe in the groove of the actuating member and sliding these parts into the recess 46 before the screw 53 is inserted. The shoe 52 thereafter receives the end thrust of the actuating member and prevents axial movement thereof. Rotation of said member 50 thus causes longitudinal movement of the plunger 45 to tighten the binding plugs 43 against the body 10 and prevent rotation of the shaft 11.

When taking a series of readings, or when comparing internal diameters of different articles, it is desirable that the readings should be taken with the same tension on the gauge bars, and for this purpose I provide a ratchet ring 54 (Figs. 1 and 2) loosely mounted upon the end of the shaft 11, and having teeth 55 engaged by one or more spring plungers 56 mounted for longitudinal movement in the collar 41 previously described.

The ring 54 is positioned longitudinally on the shaft 11 by a pair of blocks or shoes 57 loosely secured to the ends of adjusting screws 58. A groove 59 for the shoes is formed on the inside of the collar 54 and a corresponding groove 60 is formed on the outside of the shaft 11.

In assembling the parts, the screws 58 are turned outward, drawing the blocks 57 into the groove 59 as shown in the upper part of Figs. 2 and 5. After the ring is placed in position on the shaft 11, the screws are turned inward, seating the blocks in the groove 60 of the shaft 11 as shown in the lower part of the same figures.

When the parts are thus assembled, the shaft 11 may then be turned by grasping the ring 54, the serrated teeth of which will slip by the plunger 56 when a certain resistance is encountered by the bars 14. The teeth 55 extend under the flange of the collar 41 and the parts are thus effectually shielded from dirt or injury.

The operation and use of my improved gauge will be understood from the preceding description. As the shaft 11 is turned relatively to the body 10, the member 12 is moved longitudinally with a sliding motion relative to the gauge bars 14, which are thereby moved radially inward or outward in accordance with the direction of rotation of the shaft 11.

Uniform gauge tension may be obtained by use of the serrated ring 54 and a gauge reading may be preserved by turning the actuating member 50 to force the binding plugs 43 outward against the body 10. The exact diameter of the desired gauge may be read from the scale 36, and the graduated ring 40, one division of the scale 36 corresponding to one revolution of the ring 40. The gauge shown in the drawings may be thus read directly to one ten-thousandth of an inch and fractions of one ten-thousandths may be readily estimated.

Suitable oil passage 62, 63 and 64 are provided within the shaft 11 and member 12, and the recess 46 in the shaft 11 may be utilized as an oil chamber from which the working parts may be easily lubricated.

Having thus described my invention, it will be evident that changes and modifications can be made therein, by those skilled in the art, within the spirit and scope of my invention as set forth in the claims, and I do not wish to be otherwise limited to the details herein disclosed, but what I claim is:—

1. An adjustable gauge comprising a body, a threaded shaft mounted for rotation only therein, a member threaded thereon, and provided with bearing surfaces inclined to the axis of said shaft, a plurality of gauge bars having portions contacting with said inclined surfaces slidably mounted in said member and movable simultaneously radially thereby, a nut threaded in said member and also threaded on said shaft, and means accessible from the side of said member for adjusting said nut.

2. An adjustable gauge comprising a body, a threaded shaft mounted for rotation only therein, a member threaded thereon, and provided with bearing surfaces inclined to the axis of said shaft, a plurality of gauge bars having portions contacting with said inclined surfaces slidably mounted in said member and movable simultaneously radially thereby, a nut threaded in said member and also threaded on said shaft and having worm gear teeth formed thereon, a worm mounted in said member and engaging said gear, and means whereby said worm may be turned to adjust said nut.

3. In an adjustable gauge, in combination, a body, a threaded shaft mounted for rotation only therein, a member threaded on said shaft and provided with bearing surfaces inclined to the axis of said shaft, a plurality of gauge bars having portions contacting with said inclined surfaces slidably mounted in said member and movable simultaneously radially thereby, a recessed flanged collar rotatable relative to said shaft and preventing longitudinal movement of said bars relative to said body, a pair of binding nuts for said collar threaded on said shaft and disposed in the recess of said collar, and a washer positioned between said nuts and held from rotation relative to said shaft.

4. In an adjustable gauge, in combination, a body, a threaded shaft mounted for rotation only therein, a member threaded on said shaft and provided with bearing surfaces inclined to the axis of said shaft, a plurality of gauge bars having portions contacting with said inclined surfaces slidably mounted in said member and movable simultaneously radially thereby, a recessed flanged collar rotatable on said shaft and preventing longitudinal movement of said bars relative to said body, means disposed in the recess of said collar to position said collar on said shaft, and a disc threaded in said collar and sealing the outer end of the recess therein.

5. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted in said member and movable simultaneously radially thereby, and an indicating device movable longitudinally with said member, said indicating device and body having cooperating graduations indicating gauge diameter.

6. An adjustable gauge comprising a body having a longitudinal recess, a threaded shaft mounted for rotation in said body, a member threaded on said shaft and provided with bearing surfaces inclined to the axis of said shaft, a plurality of gauge bars having portions contacting with said inclined surfaces, slidably mounted in said member and movable simultaneously radially thereby, and a rod fixed to said member and movable longitudinally in the recess in said body, said recess being partially open on one side and said rod and body having co-operating graduations to indicate gauge diameter.

7. An adjustable gauge comprising a body, a threaded shaft mounted for rotation only therein, a member threaded on said shaft and having a longitudinal recess on said shaft, said member being provided with bearing surfaces inclined to the axis of said shaft and having a longitudinal recess, a plurality of gauge bars having portions contacting with said inclined surface, slidably mounted in said member and movable simultaneously radially thereby, a rod mounted in the recess in said member and adjustable longitudinally therein, and means to hold said rod adjusted position, said rod and body having cooperating graduations to indicate gauge diameter.

8. An adjustable gauge comprising a body having a longitudinal recess, a threaded shaft mounted for rotation only therein, a member threaded on said shaft and provided with bearing surfaces inclined to the axis of said shaft, a plurality of gauge bars having portions contacting with said inclined surfaces slidably mounted in said member and movable simultaneously radially thereby, and an indicating device movable with said member and extending into the recess in said body, said device and body having cooperating graduations indicating gauge diameter, and said recess being partially open to permit reading thereof.

9. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted in said member and movable simultaneously radially thereby, and a sleeve by which said shaft may be turned, said shaft having a spring plunger mounted in fixed relation thereto, and said sleeve being fixed longitudinally of said shaft and having teeth on one side thereof positioned for engagement by said plunger.

10. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted in said member and movable simultaneously radially thereby, a collar fixed to said shaft and recessed at one end, a sleeve loose on said shaft and having serrated teeth extending into the recess of said collar, and a device mounted in said collar and yieldingly engaging said teeth whereby said shaft may be turned with a pre-determined tension.

11. An adjustable gauge comprising a body, a threaded shaft mounted for rotation only therein, a member threaded thereon and provided with bearings surfaces inclined to the axis of said shaft, a plurality of gauge bars having portions contacting with said inclined surfaces slidably mounted in said member and movable simultaneously radially thereby, a sleeve by which said shaft may be turned, a yielding connection between said shaft and said sleeve, and means to hold said sleeve in fixed longitudinal position relative to said shaft.

12. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted in said member and movable simultaneously radially thereby, a sleeve by which said shaft may be turned, a yielding connection between said shaft and said sleeve, and means on said collar fitting a groove in said shaft to position said sleeve longitudinally.

13. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted on said member and movable simultaneously radially thereby, binding plugs mounted to slide in a radial recess in said shaft, a plunger mounted for longitudinal movement only in said shaft and having wedging engagement with said plugs, and means to move said plunger.

14. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted in said member and movably simultaneously radially thereby, binding plugs mounted to slide in a radial recess in said shaft, a threaded plunger mounted for longitudinal movement only in said shaft, and an actuating member rotatable in said shaft but held from axial movement relative thereto and threaded to cooperate with the threaded portion of said plunger to move said plunger longitudinally and said plugs radially.

15. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted in said member and movable simultaneously radially thereby, binding plugs mounted to slide in a radial recess in said shaft, a plunger mounted for longitudinal movement only in said shaft, an actuating member rotatable in said shaft and having a circumferential groove, and a block fixed to said shaft and positioned in said groove, said actuating member having threaded engagement with said plunger and being effective through said plunger to move said binding plugs radially.

16. An adjustable gauge comprising a body, a threaded shaft mounted for rotation only therein, a member threaded thereon and provided with bearing surfaces inclined to the axis of said shaft, a plurality of gauge bars having portions contacting with said inclined surfaces slidably mounted in said member and movable simultaneously radially thereby, a nut threaded in said member and also threaded on said shaft, and means for adjusting and holding said nut.

17. An adjustable gauge comprising a body, a threaded shaft mounted for rotation only therein, a member threaded thereon and provided with bearing surfaces inclined to the axis of said shaft, a plurality of gauge bars slidably mounted in said member and movable simuntaneously radially thereby, and cooperating elements for indicating gauge diameter, said elements being associated with said member and said body respectively.

In testimony whereof I have hereunto affixed my signature.

JOHN BATH.